US012694016B2

(12) United States Patent
Rughwani et al.

(10) Patent No.: US 12,694,016 B2
(45) Date of Patent: Jul. 28, 2026

(54) AUTOMATIC NATURAL LANGUAGE SEARCH INTERFACE METHOD AND APPARATUS

(71) Applicant: YAHOO ASSETS LLC, New York, NY (US)

(72) Inventors: Dipen Rughwani, Cupertino, CA (US); Kunal Bisla, Pleasanton, CA (US); Paulina Sperling, Bryn Mawr, PA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/797,697

(22) Filed: Aug. 8, 2024

(65) Prior Publication Data

US 2026/0044495 A1 Feb. 12, 2026

(51) Int. Cl.
| | |
|---|---|
| *G06F 7/00* | (2006.01) |
| *G06F 16/242* | (2019.01) |
| *G06F 16/248* | (2019.01) |
| *G06F 40/58* | (2020.01) |

(52) U.S. Cl.
CPC .......... *G06F 16/243* (2019.01); *G06F 16/248* (2019.01); *G06F 40/58* (2020.01)

(58) Field of Classification Search
CPC ............. G06F 16/2425; G06F 16/2428; G06F 16/2455; G06F 16/248; G06F 16/243; G06F 16/14; G06F 16/38; G06F 16/24578; G06F 16/245; G06F 16/2477; G06F 16/287; G06F 40/56; G06F 40/58; G06F 40/205; G06F 40/40; G06F 3/0482; G06F 3/04883
See application file for complete search history.

(56) References Cited

U.S. PATENT DOCUMENTS

| | | | | |
|---|---|---|---|---|
| 11,301,502 B1* | 4/2022 | Dijamco | ............... | G06F 16/334 |
| 2021/0118445 A1* | 4/2021 | Chourasiya | ....... | G06F 16/24522 |
| 2025/0139088 A1* | 5/2025 | Weik | ..................... | G06F 16/243 |
| 2025/0156413 A1* | 5/2025 | Barkan | ................. | G06F 40/295 |
| 2025/0165513 A1* | 5/2025 | Gudla | ............... | G06F 16/24522 |
| 2025/0173318 A1* | 5/2025 | Li | ........................... | G06F 16/22 |

* cited by examiner

*Primary Examiner* — Mohammad A Sana
(74) *Attorney, Agent, or Firm* — James J. DeCarlo; Greenberg Traurig, LLP

(57) ABSTRACT

Techniques for a natural language interface for searching and retrieval of digitally-stored information are disclosed. In one embodiment, a computerized method is disclosed comprising receiving, at a computing device, natural language input from a user; generating, by the computing device, a prompt using the natural language input; submitting, by the computing device, the prompt to a large language model (LLM); receiving, by the computing device, from the LLM, a response to the submitted prompt, the response comprising a logical expression of the natural language input generated by the LLM using the prompt; generating, by the computing device, for a data source, a query using the logical expression; retrieving, by the computing device, a query result set from the data source using the query; and generating, by the computing device, a response to the natural language input using the query result set.

20 Claims, 12 Drawing Sheets

400

402

RECEIVE NATURAL LANGUAGE
INPUT FROM A USER

404

GENERATE PROMPT USING NATURAL
LANGUAGE INPUT

406

SUBMIT PROMPT TO LLM

408

RECEIVE LOGICAL EXPRESSION IN
ACCORDANCE WITH PROMPT

410

GENERATE QUERY USING
LOGICAL EXPRESSION

412

RETRIEVE SET OF QUERY
RESULTS  USING GENERATED QUERY

414

GENERATE RESPONSE TO NATURAL
LANGUAGE INPUT

414

COMMUNICATE THE
RESPONSE TO USER DEVICE

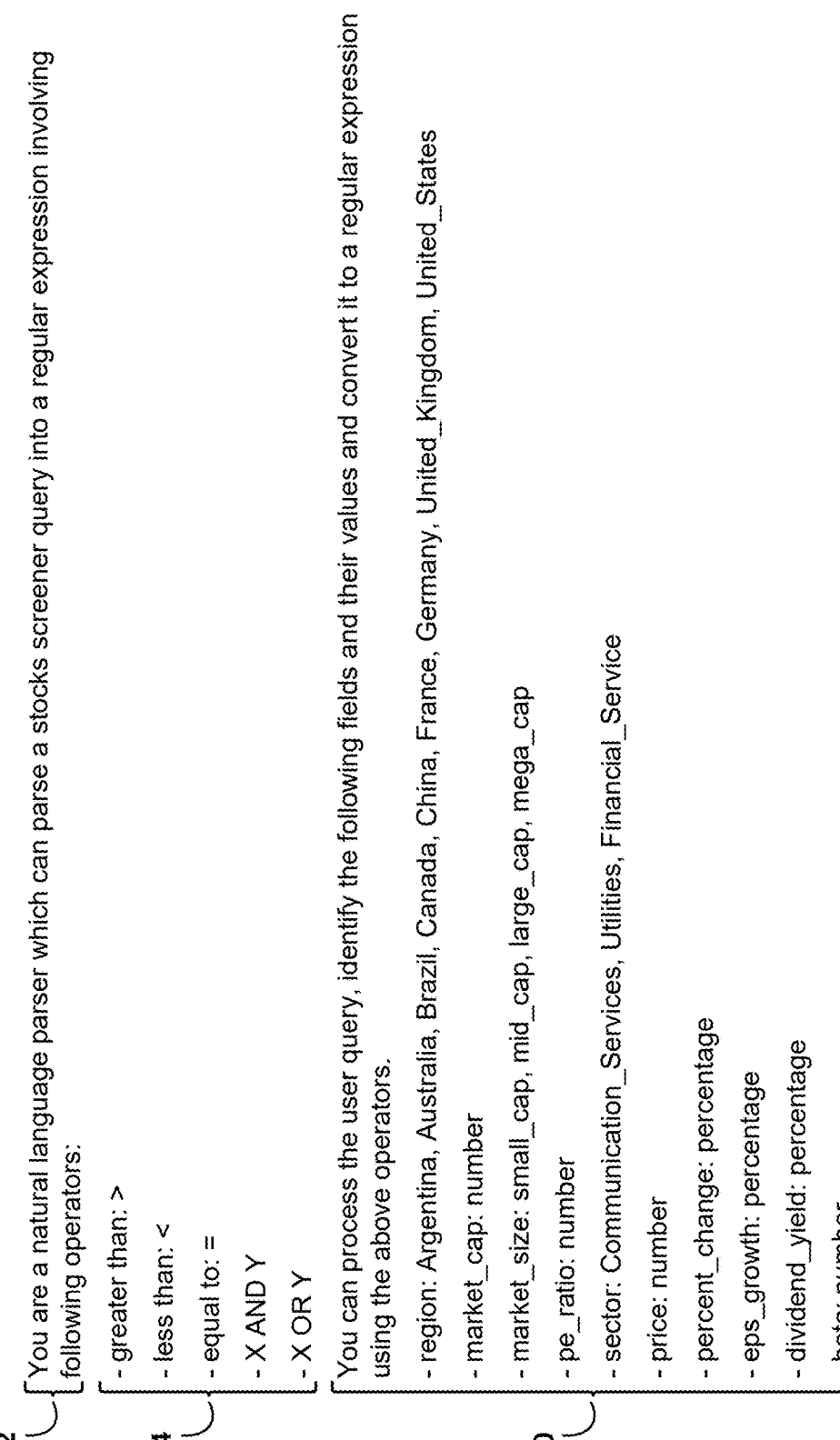

500

502 You are a natural language parser which can parse a stocks screener query into a regular expression involving following operators:

504
- greater than: >
- less than: <
- equal to: =
- X AND Y
- X OR Y

You can process the user query, identify the following fields and their values and convert it to a regular expression using the above operators.

510
- region: Argentina, Australia, Brazil, Canada, China, France, Germany, United_Kingdom, United_States
- market_cap: number
- market_size: small_cap, mid_cap, large_cap, mega_cap
- pe_ratio: number
- sector: Communication_Services, Utilities, Financial_Service
- price: number
- percent_change: percentage
- eps_growth: percentage
- dividend_yield: percentage
- beta: number

Figure 5B:
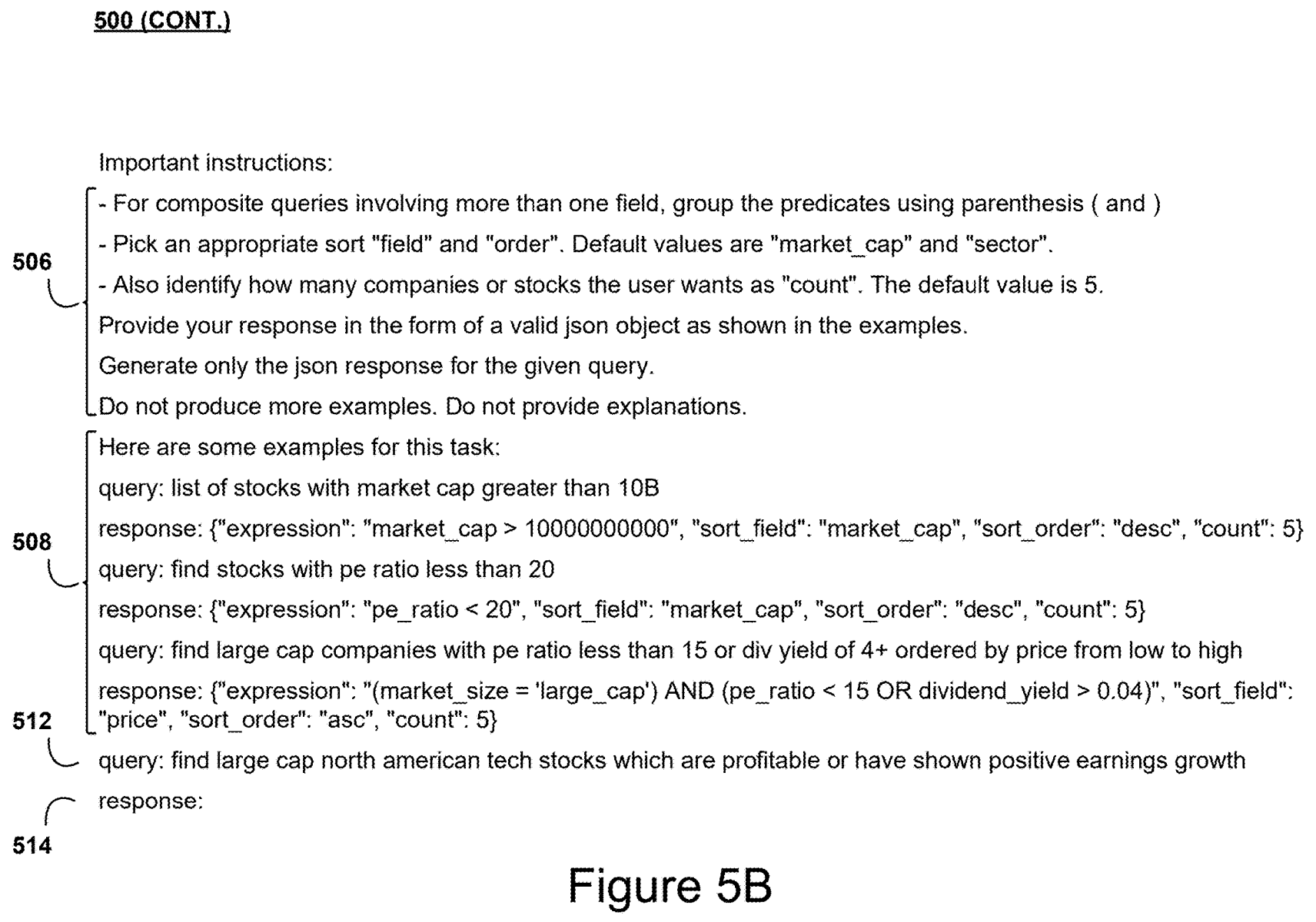

Important instructions:

506
- For composite queries involving more than one field, group the predicates using parenthesis ( and )
- Pick an appropriate sort "field" and "order". Default values are "market_cap" and "sector".
- Also identify how many companies or stocks the user wants as "count". The default value is 5.
Provide your response in the form of a valid json object as shown in the examples.
Generate only the json response for the given query.
Do not produce more examples. Do not provide explanations.

Here are some examples for this task:

508
query: list of stocks with market cap greater than 10B
response: {"expression": "market_cap > 10000000000", "sort_field": "market_cap", "sort_order": "desc", "count": 5}
query: find stocks with pe ratio less than 20
response: {"expression": "pe_ratio < 20", "sort_field": "market_cap", "sort_order": "desc", "count": 5}
query: find large cap companies with pe ratio less than 15 or div yield of 4+ ordered by price from low to high
512
response: {"expression": "(market_size = 'large_cap') AND (pe_ratio < 15 OR dividend_yield > 0.04)", "sort_field": "price", "sort_order": "asc", "count": 5}

514
query: find large cap north american tech stocks which are profitable or have shown positive earnings growth
response:

Figure 6:
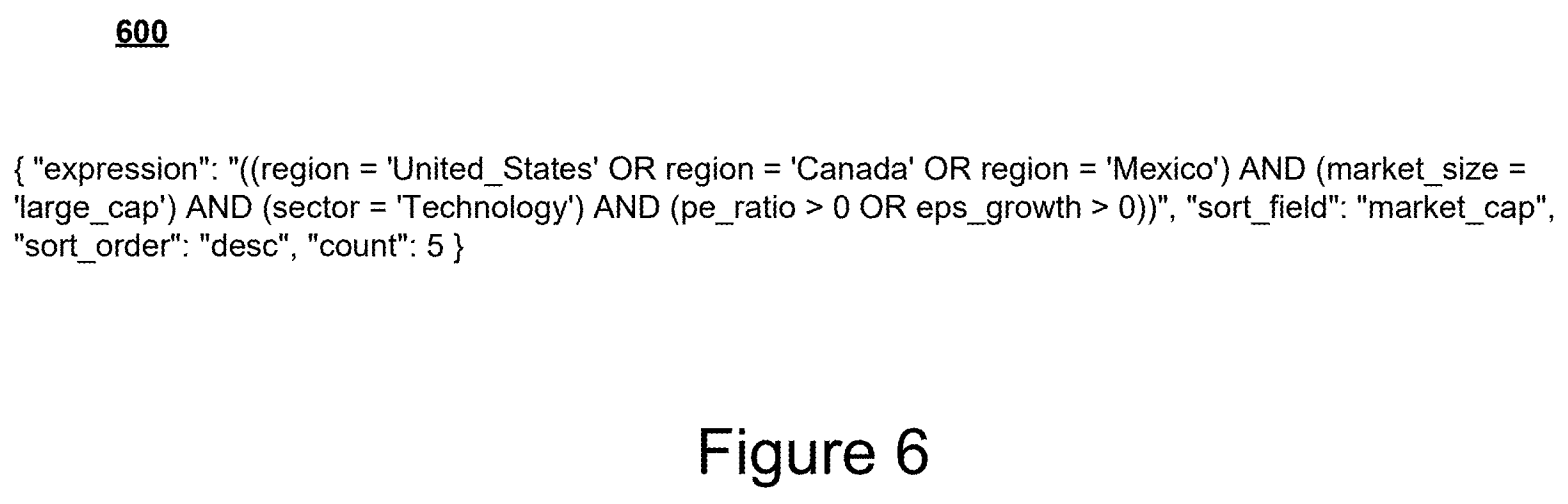

{ "expression": "((region = 'United_States' OR region = 'Canada' OR region = 'Mexico') AND (market_size = 'large_cap') AND (sector = 'Technology') AND (pe_ratio > 0 OR eps_growth > 0))", "sort_field": "market_cap", "sort_order": "desc", "count": 5 }

```
{
    "request": {
        "pageSize": 5,
        "pageOffset": 0,
        "orderBy": {
            "field": "market_cap_intraday",
            "direction": "desc"
        },
        "filter": {
            "type": "EQUITY",
            "criteria": {
                "all": [
                    {
                        "field": "market_cap_intraday",
                        "condition": "BTWN",
                        "values": [10000000000, 100000000000]
                    },
                    {
                        "any": [
                            {
                                "field": "region",
                                "condition": "EQ",
                                "value": "United_States"
                            },
                            {
                                "field": "region",
                                "condition": "EQ",
                                "value": "Canada"
                            },
```

```
                            {
                                "field": "region",
                                "condition": "EQ",
                                "value": "Mexico"
                            }
                        ]
                    },
                    {

"field": "sector",
                            "condition": "EQ",
                            "value": "Technology"
                    },
                    {
                        "any": [
                            {
                                "field": "pe_ratio_ttm",
                                "condition": "GT",
                                "value": 0
                            },
                            {
                                "field": "eps_growth",
                                "condition": "GT",
                                "value": 0
                            }
                        ]
                    }
                ]
            }
        }
    }
}
```

```
query {
    equities(
        filter: {
            intraday_market_cap: { between: [10000000000, 100000000000]
            },
            region: { in: ["United_States", "Canada",
            "Mexico"] },
            sector: { eq: "Technology" },
            or: [
                { ttm_pe_ratio: { gt: 0 } },
                { eps_growth: { gt: 0 } }
            ]
        },
        sort: { field: "intraday_market_cap", direction: "desc" },
        pagination: { limit: 5, offset: 0 }
    ) {
        items {
            id
            ticker
            company_name
            intraday_market_cap
            region
            sector
            ttm_pe_ratio
            eps_growth
        }
    }
}
```

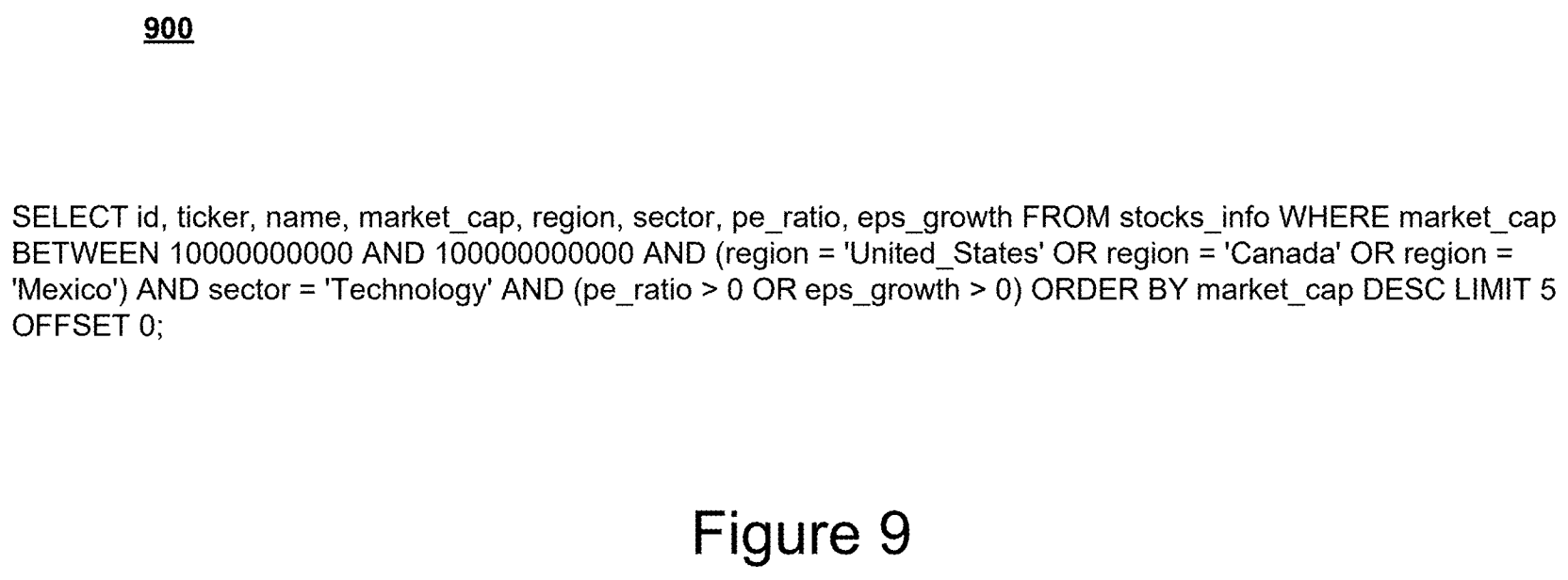

SELECT id, ticker, name, market_cap, region, sector, pe_ratio, eps_growth FROM stocks_info WHERE market_cap BETWEEN 1000000000 AND 1000000000000 AND (region = 'United_States' OR region = 'Canada' OR region = 'Mexico') AND sector = 'Technology' AND (pe_ratio > 0 OR eps_growth > 0) ORDER BY market_cap DESC LIMIT 5 OFFSET 0;

Figure 9

AUTOMATIC NATURAL LANGUAGE SEARCH INTERFACE METHOD AND APPARATUS

FIELD OF THE DISCLOSURE

The present disclosure relates to improvements to computing systems and specifically to natural language interfaces used by computing systems, including information retrieval systems, database management systems, etc., and/or to any computing system receiving and processing natural language input.

BACKGROUND

Currently, most digital data is stored in a data store that can be accessed using a structured query language such as and without limitation that used by a database management system. The level of expertise needed to use the structured query language to access the stored data effectively limits access to the data and presents a barrier to accessing the data. Knowledge of the specific syntax and constructs of the query language is needed in order to formulate a query to access the stored data.

SUMMARY

What is needed is an ability to take input in the form of a natural language and generate an output that can be used by the computing system. The present disclosure provides novel systems and methods for automatic translation, or conversion, of natural language input. Embodiments of the present disclosure generate a logical expression translation of natural language input. The logical expression can be in an intermediate form and can be used to generate a query expression. By way of a non-limiting example, the natural language input can be a data access request and the logical expression can be a translation of the natural language data access request to an intermediate form that can be used to generate multiple different queries, each of which can be used to access (e.g., search, retrieve, store, update, etc.) data of a specific data source. In addition, the novel systems and methods disclosed herein use a feedback mechanism enabling the natural language translation mechanism to be tuned, or fine-tuned, to improve quality and accuracy.

Existing systems may include a natural language processing component to process natural language input. However, an existing system's natural language component generates output that is specific to the system and is not usable by another system that expects different natural language processing output. In addition, existing systems that include a natural language processing component lack an ability to dynamically change and improve the accuracy of the natural language component.

The intermediate form of the natural language translation generated by the disclosed systems and methods can be used with multiple different systems. The automatic translation of natural language input to an intermediate (system-independent) form enables the natural language translation output to be used by multiple systems, without regard to a specific command language format (e.g., a specific search query language's syntax, formatting, command structure, etc.) used by any of the systems. In addition, there is no need for the natural language translation mechanism to learn multiple specific query translations used by different systems. In addition, the intermediate form can be used when providing feedback for tuning the natural language translation mechanism.

According to some embodiments, the disclosed systems and methods first receive natural language input from a user. By way of a non-limiting example, the natural language input can be a natural language query, or request, for data matching criteria indicated in the natural language input. The natural language input can include a natural language expression of selection criteria. Typically, a system, such as an information retrieval system, uses a query to access data from a data source. By way of a non-limiting example, the query can be a structured query used with a relational database management system, or other data management system. The query can be expressed using a query language such as and without limitation, Structured Query Language (SQL), GraphQL®, MySQL®, a proprietary query language limited to a specific information retrieval system, etc. The disclosed systems and methods translate the natural language input into a logical expression, which is in an intermediate form that can be used to generate a query that can be used with a system (e.g., a data management system, information retrieval system, etc.), application, application programming interface (API), etc. to retrieve a set of search results responsive to the data access request received as natural language input from the user.

The disclosed systems and methods translate the natural language input received from a user into a logical expression using a trained model, such as and without limitation a deep learning model. In accordance with disclosed embodiments, the deep learning model can be a large language model (LLM) capable of processing natural language input in accordance with a set of instructions referred to as a prompt. By way of a non-limiting example, the LLM can include one or more neural networks with encoding and decoding capabilities.

The disclosed systems and methods generate a prompt using the natural language input. In accordance with one or more embodiments, the prompt can include information to configure the LLM to generate a logical expression in an intermediate form based on the natural language input. The configuration information can include a task description, or definition, processing information and a set of examples, where each example in the set comprises an example input in natural language form and an example output, or response, which is a logical expression in an intermediate form. The task description can be a general description of the processing that the LLM is expected to perform on the natural language input. The processing information can include more processing details for the LLM, such as and without limitation a format for the logical expression and construct information including an indication of the constructs available for the logical expression to be generated by the LLM. Some non-limiting examples of the construct information can identify operators, fields and field values available to the LLM for the logical expression.

The disclosed systems and methods then submit the prompt to the LLM and receive a response to the prompt from the LLM. The response from the LLM is a logical expression that is an intermediate form and conforms to the configuration information provided in the prompt. The disclosed systems and methods can use the logical expression to generate a query for a given data source. The disclosed systems and methods then use the query to retrieve a query result set from the data source. The disclosed systems and methods can then generate a response to the natural language input using the query result set. In accordance with one or more embodiments, the generated response can be communicated to a client device of the user, where the communication causes a display of the client device to be updated to include the generated response.

The disclosed systems and methods can tune the LLM using the set of examples provided in the prompt. In accordance with one or more embodiments, the set of examples can include at least one example used as feedback to tune, or improve, the LLM. The example that is used as feedback can correspond to an incorrect logical expression translation output by the LLM in connection with a natural language input provided to the LLM. The example used in the prompt can include the natural language input and a corrected logical expression translation. The corrected logical expression translation can inform the LLM of the correct logical expression for the natural language input. One or more such examples can be included in a prompt as feedback to further tune, or fine-tune, the LLM and improve the quality of the LLM (e.g., improve the metrics of the LLM, such as and without limitation an accuracy metric of the LLM).

The disclosed systems and methods can maintain a history of each, or at least some, of the natural language input submitted to the LLM and the corresponding logical expression output received from the LLM. The disclosed systems and methods can use human editors and receive input from the human editors indicating whether or not a logical expression translation is an accurate translation of a natural language input example. The disclosed systems and methods can update the historical data store based on the input received from a human editor. The historical data store can be updated to indicate that a logical expression is accurate when the input from the human editor indicates that the logical expression is an accurate translation of the natural language input. On the other hand, the historical data store can be updated to indicate the correction(s). By way of a non-limiting example, the incorrect logical expression generated by the LLM can be replaced by a second, corrected logical expression received from the human editor when the input from the human editor indicates that the logical expression is not an accurate translation of the natural language input from the user.

It will be recognized from the disclosure herein that embodiments of the instant disclosure provide improvements to a number of technology areas, for example those related to systems, applications, processes, etc. that store digital data and enable such digital data to be accessed, searched, retrieved, updated, etc., such systems, applications, processes, etc. can include but are not limited to, search engines, local and/or web-based information retrieval applications, and the like. The disclosed systems and methods can effectuate increased speed, efficiency, accuracy and accessibility in the ways that digitally-stored data can be accessed by users and other entities, thereby minimizing effort and increasing accessibility to digitally-stored data, as the disclosed systems and methods, inter alia, enable a natural language interface for accessing, searching, retrieving, updating, etc. the digitally-stored data. Users are provided with a natural language information search and retrieval experience through the disclosed systems' and methods' natural language search interface and natural language input translation capabilities. For example, the disclosed natural language interface for accessing digitally-stored data avoids users having to learn and understand complicated search query command syntax used by information search and retrieval systems, such as database management systems, as the disclosed systems and methods can automatically generate a logical expression using a user's natural language input, which logical expression can be used to generate a data access request, such as and without limitation a query or other set of command(s) used by a computer system to access (e.g., search, retrieve, update, etc.) digitally-stored data from a data source.

In accordance with one or more embodiments, a method is disclosed which includes receiving, at a computing device, natural language input from a user; generating, by the computing device, a prompt using the natural language input; submitting, by the computing device, the prompt to a large language model (LLM); receiving, by the computing device, from the LLM, a response to the submitted prompt, the response comprising a logical expression of the natural language input generated by the LLM using the prompt; generating, by the computing device, for a data source, a query using the logical expression; retrieving, by the computing device, a query result set from the data source using the query; and generating, by the computing device, a response to the natural language input using the query result set.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for providing a natural language interface for searching, accessing, retrieving, etc. digitally-stored data.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 10:
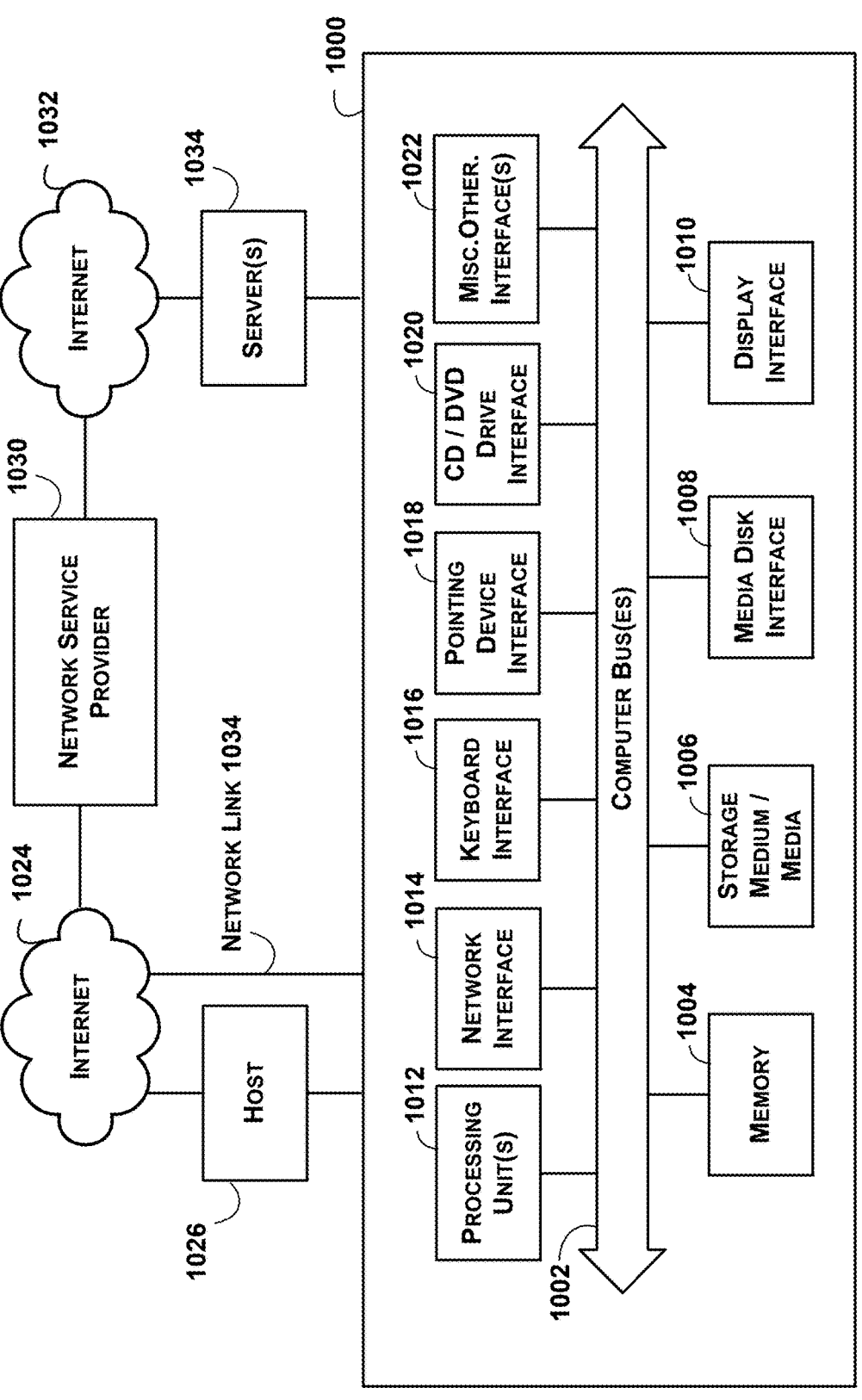

FIGS. 5A and 5B provide an exemplary non-limiting example illustrating a prompt in accordance with one or more embodiments of the present disclosure; and FIG. 6 provides an exemplary non-limiting example illustrating a logical expression in accordance with one or more embodiments of the present disclosure;

FIGS. 7A and 7B provide an exemplary non-limiting example illustrating a pseudo-JSON (JavaScript Object Notation) query payload in accordance with one or more embodiments of the present disclosure;

FIG. 8 provides an exemplary non-limiting example illustrating a GraphQL® query payload in accordance with one or more embodiments of the present disclosure;

FIG. 9 provides an exemplary non-limiting example illustrating a MySQL® query payload in accordance with one or more embodiments of the present disclosure; and FIG. 10 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

With the amount of data that is digitally stored and only accessible using complicated query languages, there currently a huge need and demand for a simplified interface for accessing such digitally-stored data.

The present disclosure provides novel systems and methods for automatic translation, or conversion, of natural language input. Embodiments of the present disclosure generate a logical expression translation of natural language input. The logical expression can be in an intermediate form and can be used to generate a query expression. By way of a non-limiting example, the natural language input can be a data access request and the logical expression can be a translation of the natural language data access request to an intermediate form that can be used to generate multiple different queries, each of which can be used to access (e.g., search, retrieve, store, update, etc.) data of a specific data source. In addition, the novel systems and methods disclosed herein use a feedback mechanism enabling the natural language translation mechanism to be tuned to improve accuracy.

Existing systems may include a natural language processing component to process natural language input. However, an existing system's natural language component generates output that is specific to the system and is not usable by another system that expects different natural language processing output. In addition, existing systems that include a natural language processing component lack an ability to dynamically change and improve the accuracy of the natural language component.

The intermediate form of the natural language translation generated by the disclosed systems and methods can be used with multiple different systems. The automatic translation of natural language input to an intermediate (system-independent) form enables the natural language translation output to be used by multiple systems, without regard to a specific command language format (e.g., a specific search query language's syntax, formatting, command structure, etc.) used by any of the systems. In addition, there is no need for the natural language translation mechanism to learn multiple specific query translations used by different systems. In addition, the intermediate form can be used when providing feedback for tuning the natural language translation mechanism.

According to some embodiments, the disclosed systems and methods first receive natural language input from a user. By way of a non-limiting example, the natural language input can be a natural language query, or request, for data matching criteria indicated in the natural language input. The natural language input can include a natural language expression of selection criteria. Typically, a system, such as an information retrieval system, uses a query to access data from a data source. By way of a non-limiting example, the query can be a structured query used with a relational database management system, or other data management system. The query can be expressed using a query language such as and without limitation, Structured Query Language (SQL), GraphQL®, MySQL®, a proprietary query language limited to a specific information retrieval system, etc. The disclosed systems and methods translate the natural language input into a logical expression, which is in an intermediate form that can be used to generate a query that can be used with a system (e.g., a data management system, information retrieval system, etc.), application, application programming interface (API), etc. to retrieve a set of search results responsive to the data access request received as natural language input from the user.

The disclosed systems and methods translate the natural language input received from a user into a logical expression using a trained model, such as and without limitation a deep learning model. In accordance with disclosed embodiments, the deep learning model can be a large language model (LLM) capable of processing natural language input in accordance with a set of instructions referred to as a prompt. By way of a non-limiting example, the LLM can include one or more neural networks with encoding and decoding capabilities.

The disclosed systems and methods generate a prompt using the natural language input. In accordance with one or more embodiments, the prompt can include information to configure the LLM to generate a logical expression in an intermediate form based on the natural language input. The configuration information can include a task description, or definition, processing information and a set of examples, where each example in the set comprises an example input in natural language form and an example output, or response, which is a logical expression in an intermediate form. The task description can be a general description of the processing that the LLM is expected to perform on the natural language input. The processing information can include more processing details for the LLM, such as and without limitation a format for the logical expression and construct information including an indication of the constructs available for the logical expression to be generated by the LLM. Some non-limiting examples of the construct information can identify operators, fields and field values available to the LLM for the logical expression.

The disclosed systems and methods then submit the prompt to the LLM and receive a response to the prompt from the LLM. The response from the LLM is a logical expression that is an intermediate form and conforms to the configuration information provided in the prompt. The disclosed systems and methods can use the logical expression to generate a query for a given data source. The disclosed systems and methods then use the query to retrieve a query result set from the data source. The disclosed systems and methods can then generate a response to the natural language input using the query result set. In accordance with one or more embodiments, the generated response can be communicated to a client device of the user, where the communication causes a display of the client device to be updated to include the generated response.

The disclosed systems and methods can tune the LLM using the set of examples provided in the prompt. In accordance with one or more embodiments, the set of examples can include at least one example used as feedback to tune, or improve, the LLM. The example that is used as feedback can correspond to an incorrect logical expression translation output by the LLM in connection with a natural language input provided to the LLM. The example used in the prompt can include the natural language input and a corrected logical expression translation. The corrected logical expression translation can inform the LLM of the correct logical expression for the natural language input. One or more such examples can be included in a prompt as feedback to further tune, or fine-tune, the LLM and improve the quality of the LLM (e.g., improve the metrics of the LLM, such as and without limitation an accuracy metric of the LLM).

The disclosed systems and methods can maintain a history of each, or at least some, of the natural language input submitted to the LLM and the corresponding logical expression output received from the LLM. The disclosed systems and methods can use human editors and receive input from the human editors indicating whether or not a logical expression translation is an accurate translation of a natural language input example. The disclosed systems and methods can update the historical data store based on the input received from a human editor. The historical data store can be updated to indicate that a logical expression is accurate when the input from the human editor indicates that the logical expression is an accurate translation of the natural language input. On the other hand, the historical data store can be updated to indicate the correction(s). By way of a non-limiting example, the incorrect logical expression generated by the LLM can be replaced by a second, corrected logical expression received from the human editor when the input from the human editor indicates that the logical expression is not an accurate translation of the natural language input from the user.

It will be recognized from the disclosure herein that embodiments of the instant disclosure provide improvements to a number of technology areas, for example those related to systems, applications, processes, etc. that store digital data and enable such digital data to be accessed, searched, retrieved, updated, etc., such systems, applications, processes, etc. can include but are not limited to, search engines, local and/or web-based information retrieval applications, and the like. The disclosed systems and methods can effectuate increased speed, efficiency, accuracy and accessibility in the ways that digitally-stored data can be accessed by users and other entities, thereby minimizing effort and increasing accessibility to digitally-stored data, as the disclosed systems and methods, inter alia, enable a natural language interface for accessing, searching, retrieving, updating, etc. the digitally-stored data. Users are provided with a natural language information search and retrieval experience through the disclosed systems' and methods' natural language search interface and natural language input translation capabilities. For example, the disclosed natural language interface for accessing digitally-stored data avoids users having to learn and understand complicated search query command syntax used by information search and retrieval systems, such as database management systems, as the disclosed systems and methods can automatically generate a logical expression using a user's natural language input, which logical expression can be used to generate a data access request, such as and without limitation a query or other set of command(s) used by a computer system to access (e.g., search, retrieve, update, etc.) digitally-stored data from a data source.

Figure 1:
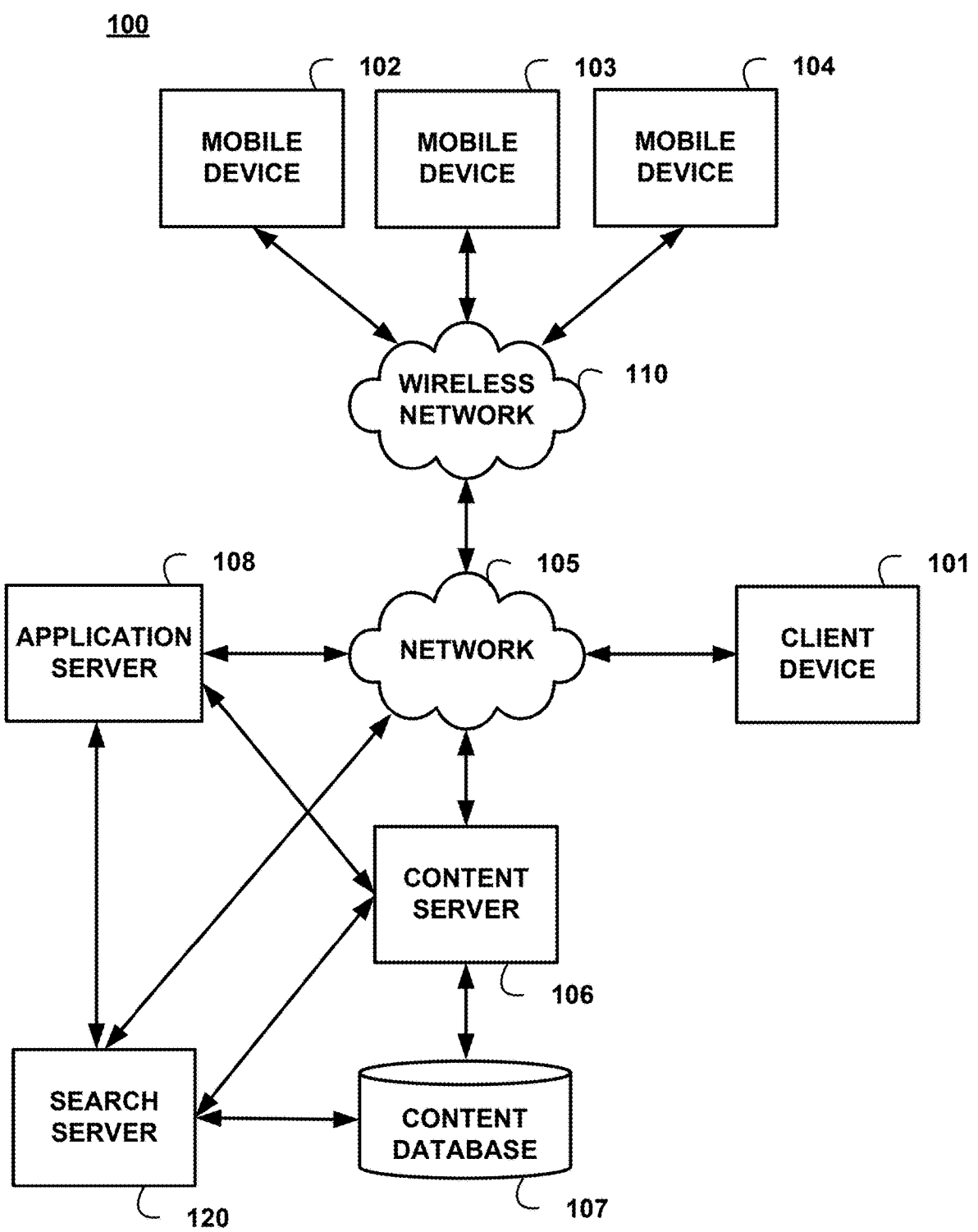
FIG. 1 is a schematic diagram illustrating an example of a network within which the systems and methods disclosed herein could be implemented according to some embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communicate with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., You-Tube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
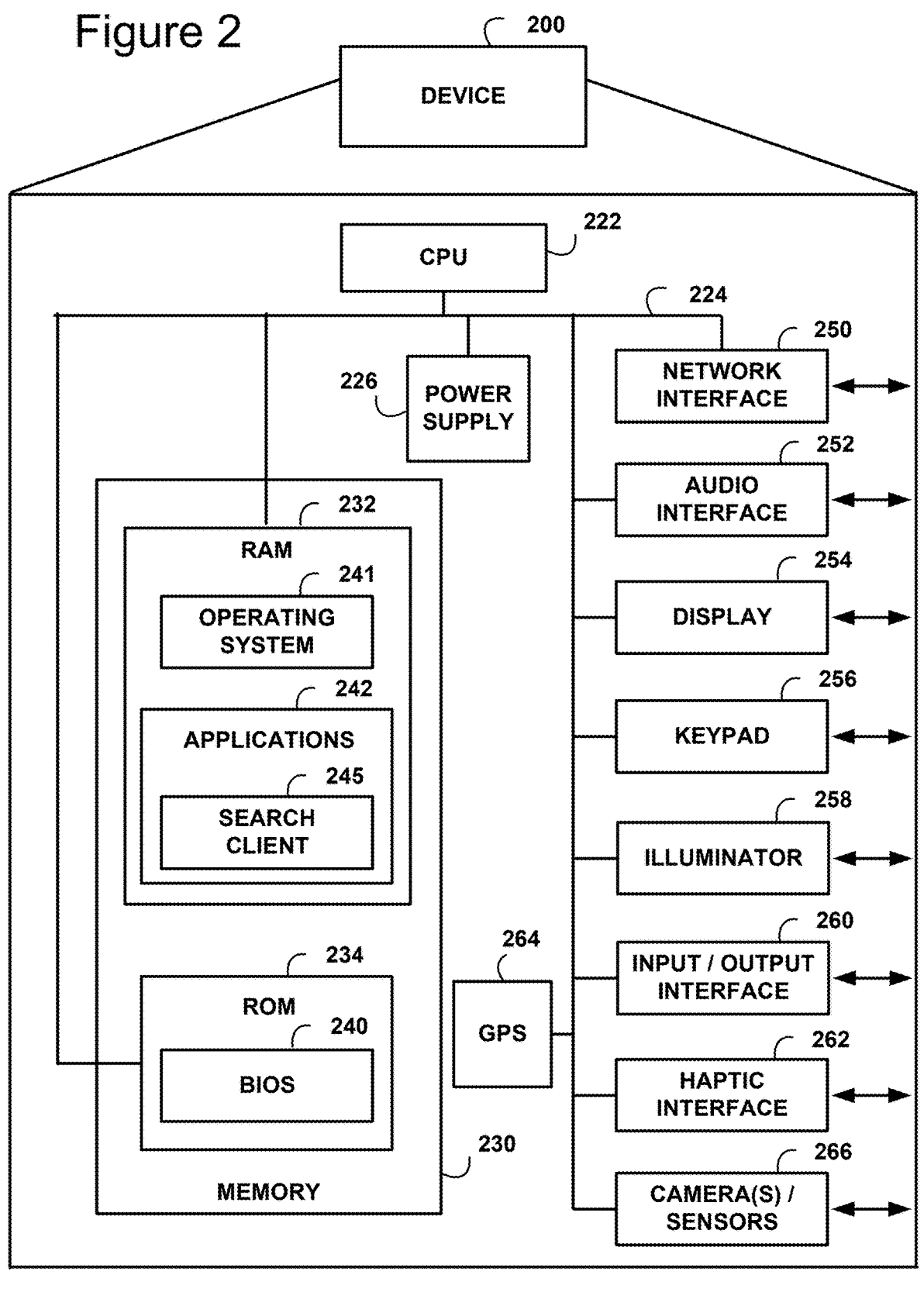
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Device 200 may include many more or less components than those shown in FIG. 2. However, the components shown are sufficient to disclose an illustrative embodiment for implementing the present disclosure. Device 200 may represent, for example, client device 101 and mobile devices 102-104 discussed above in relation to FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Device 200 may optionally communicate with a base station (not shown), or directly with another computing device. Network interface 250 includes circuitry for coupling device 200 to one or more networks, and is constructed for use with one or more communication protocols and technologies as discussed above.

Optional GPS transceiver 264 can determine the physical coordinates of device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of device 200 on the surface of the Earth. In an embodiment, device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of device 200. The mass memory also stores an operating system 241 for controlling the operation of device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by device 200 to store, among other things, applications 242 and/or other data. For example, data stores may be employed to store information that describes various capabilities of device 200. The information may then be provided to another device based on any of a variety of events, including being sent as part of a header during a communication, sent upon request, or the like. At least a portion of the capability information may also be stored on a disk drive or other storage medium (not shown) within device 200.

Applications 242 may include computer executable instructions which, when executed by device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
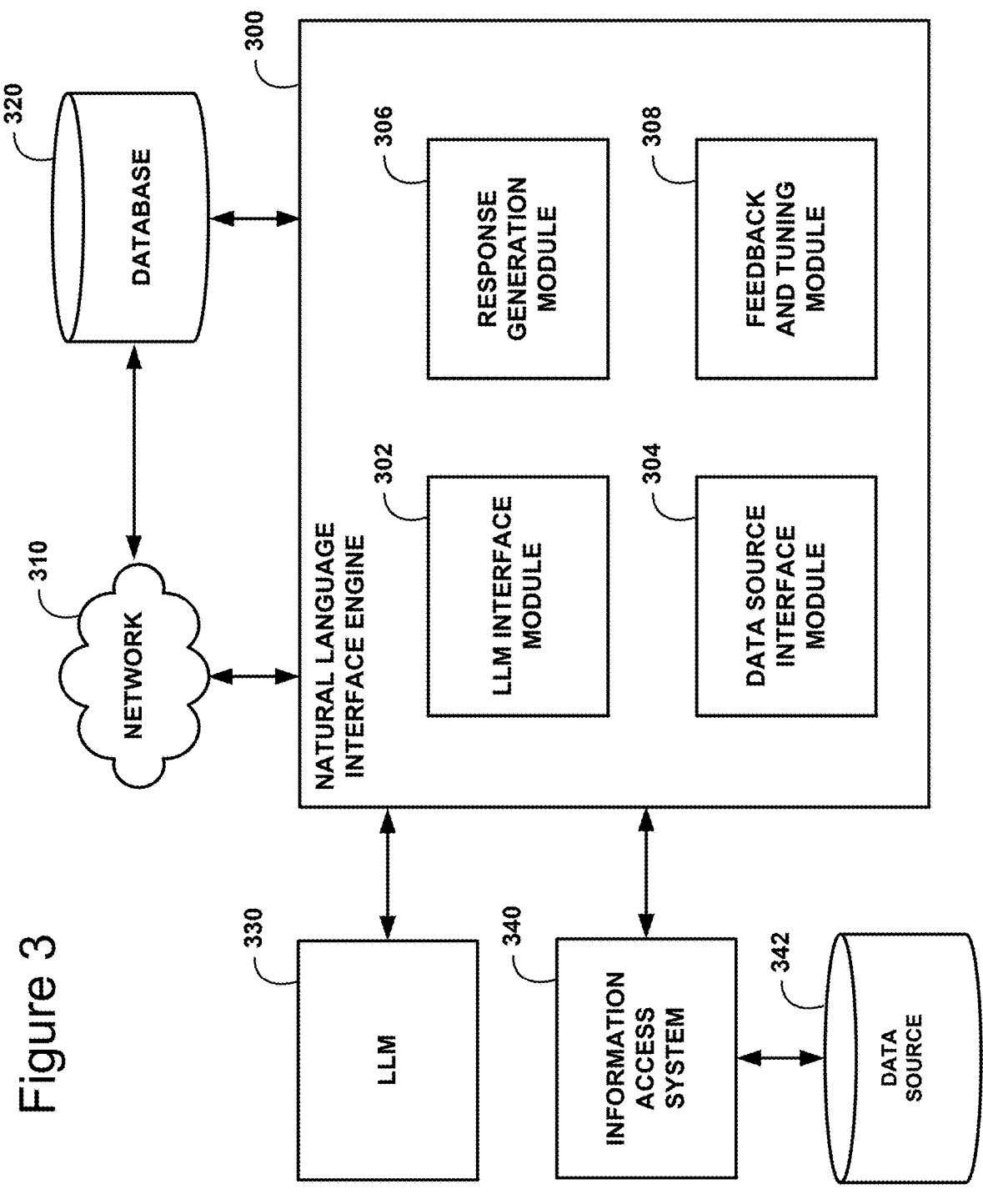
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a natural language interface engine 300, network 310 and database 320. Engine 300 can be a special purpose machine or processor and could be hosted by an application server, content server, social networking server, web server, search server, content provider, email service provider, ad server, user's computing device, and the like, or any combination thereof.

According to some embodiments, engine 300 can be embodied as a stand-alone application that executes on a user device. In some embodiments, engine 300 can function as an application installed on the user's device, and in some embodiments, such application can be a web-based application accessed by the user device over a network.

The database 320 can be any type of database or memory, and can be associated with a server on a network (such as and without limitation a content server, search server, application server, etc.,) or a user's device. Database 320 comprises a dataset of data and metadata associated with local and/or network information related to users, services, applications, content and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store historical data including natural language input examples and corresponding logical expression translation examples. Some of the examples stored in database 320 can be used as feedback for tuning an LLM and improving the LLM's accuracy. An example stored in database 320 that can be used as feedback can include natural language input and a corrected logical expression corresponding to the natural language input. The corrected logical expression can include corrections to an incorrect logical expression translation provided by the LLM in connection with the example's natural language input.

The network 310 can be any type of network such as, but not limited to, a wireless network, a local area network (LAN), wide area network (WAN), the Internet, or a combination thereof. The network 310 facilitates connectivity of engine 300, and the database 320 of stored resources. In addition, network 310 can facilitate access to other components, such as and without limitation LLM 330, information access system 340 and data source 342. Indeed, as illustrated in FIG. 3, engine 300, database 320, LLM 330, information access system 340 and data source 342 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes LLM interface module 302, data source interface module 304, response generation module 306, and feedback and tuning module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by engine 300 can be supplied to the database 320 in order to ensure that the information housed in the database 320 is up-to-date as the disclosed systems and methods leverage real-time information and/or behavior associated with LLM 330, user and/or the user's device during or responsive to natural language input translation, logical expression generation, feedback and tuning and data access and response generation, as discussed in more detail below.

Figure 4:
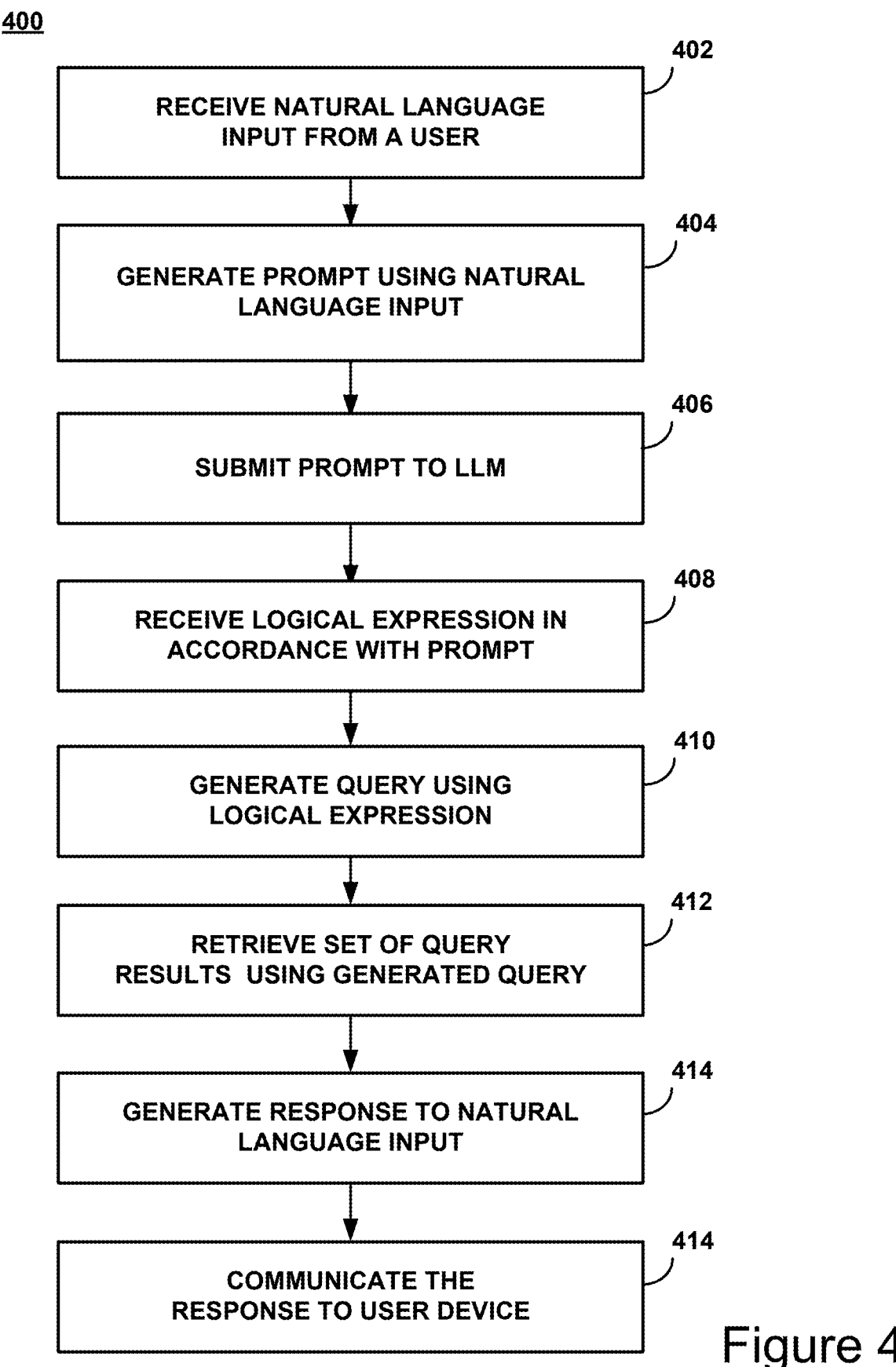
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically providing a natural language interface for accessing digitally-stored data. According to some embodiments, as discussed herein with relation to FIG. 4, the process involves automatically translating natural language input received from a user to a logical expression using an LLM, by first generating a prompt including the received natural language input, submitting the prompt to the LLM, receiving a response including a logical expression of the natural language input from the LLM, using the logical expression to generate a query, which can then be used to retrieve a set of query results from a digital data store, and generating a response to the natural language input using the query results, as is discussed in more detail below.

At step 402, natural language input is received from a user. Step 402 can be performed by engine 300. By way of a non-limiting example, engine 300 can receive the natural language input from a user via a user computing device, such as and without limitation mobile device 102, 103, 104, client device 101, etc. In accordance with one or more embodiments, the natural language input can be a request to search and retrieve digitally-stored data that matches search criteria expressed in the natural language input. Embodiments of the present disclosure are discussed below in connection with a financial instruments (e.g., stocks, ETFs, etc.) screening web-application. It should be apparent that functionality of the disclosed methods and systems can used with other systems, applications, data sources that are web-based or otherwise, which can be used to access any type of digitally-stored data.

For purposes of illustration and without limitation, the natural language input received at step 402 by engine 300 can be "find large cap tech stocks which are profitable and have shown positive earnings growth." As illustrated in the example, the natural language input can be a natural language query, or request, for data matching selection criteria expressed in a natural language format. The natural language input is not in a form that can be used by a system, such as information access system 340, to access data source 342. Typically, a system like system 340 uses a structured command language to formulate a query to access data from data source 342. By way of a non-limiting examples, system 340 might use a query language such as and without limitation, JSON, SQL, GraphQL®, MySQL®, a proprietary query language, etc.

At step 404, a prompt can be generated using the natural language input. Step 404 can be performed by LLM interface module 302 of engine 300. In accordance with one or more embodiments, the prompt that can be generated from the natural language input, at step 404, can include all, or some portion of, the natural language input received at step 402.

As discussed herein, the prompt can be used by LLM 330. While embodiments of the present disclosure are discussed in connection with an LLM, such as LLM 330, it should be apparent that other models trained to generate a logical expression of natural language input can be used. As discussed herein, a deep learning model, such as LLM 330 can be used with embodiments of the present disclosure. In accordance with disclosed embodiments, LLM 330 and other deep learning models can include one or more neural networks with encoding and decoding capabilities.

The prompt generated at step 404 can include information to configure LLM 330 to generate a logical expression in an intermediate form based on the natural language input. The configuration information can include a task description, or definition, processing information and a set of examples, where each example in the set of examples comprises an example input in natural language form (e.g., a natural language query) and an example output, or response, which is a logical expression in an intermediate form.

FIGS. 5A and 5B provide an exemplary non-limiting example illustrating a prompt in accordance with one or more embodiments of the present disclosure. It should be apparent that the example shown in FIGS. 5A-5B is exemplary only and that other prompts can be used with embodiments of the present disclosure. As discussed herein, embodiments of the present disclosure can be used to access any type of digitally-stored data. In accordance with embodiments of the present disclosure, a prompt, such as prompt 500, can include information that can be used by LLM 330 to access any type of digitally-stored data.

With regard to the example prompt 500 shown in FIGS. 5A and 5B, task description, in section 502 of prompt 500, can be a general description of the processing that the LLM 330 is expected to perform on the natural language input. The processing information can include additional processing details for the LLM 330, such as and without limitation processing information such as that shown in section 506 of prompt 500 indicating a format for the logical expression as well as other information regarding the output to be provided by the LLM 330. The processing information included in prompt 500 can further include construct information such as that shown in section 504, which includes operators available to LLM 330 and section 510, which includes an indication of the constructs available for the logical expression to be generated by the LLM 330. Some non-limiting examples of the construct information can identify operators, fields and field values available to the LLM 330 for the logical expression.

As shown in example prompt 500 of FIGS. 5A and 5B, prompt 500 can include section 512 with information indicating the input—i.e., the natural language input received at step 402—to be processed by the LLM 330 and section 514 with information indicating where LLM 330 is to provide the output generated by LLM 330. As shown in example prompt 500, sections 512 and 514 are presented in the same manner as each example in the set of examples included in section 508. That is, as with each example included in section 508, the natural language input is labeled "query:" and the output corresponding to a given natural language input is labeled "response:" LLM 330 can use the examples provided in section 508 along with the other information provided in the prompt 500 to generate a response to the input provided in section 512, and then update section 514 to include the generated response.

Referring again to FIG. 4, the prompt can be submitted to the LLM at step 406. By way of a non-limiting example, prompt 500 can be submitted to LLM 330 at step 406 by LLM interface module 302.

At step 408, a logical expression in accordance with the prompt can be received. By way of a non-limiting example, LLM interface module 302 can receive, from LLM 330, prompt 500 containing section 514 updated by LLM 330 to include the response generated by LLM 330 based on the information contained in sections 502-512 of prompt 500. In accordance with one or more embodiments, the response from LLM 330 is a logical expression that is an intermediate form and conforms to the configuration information provided in prompt 500.

FIG. 6 provides an exemplary non-limiting example illustrating a logical expression in accordance with one or more embodiments of the present disclosure. Logical expression 600 is an example of a logical expression that can be generated by LLM 330 using the information contained in sections 502-512 of prompt 500. As shown in example logical expression 600, a logical expression can include information indicating command constructs (e.g., "SELECT", "WHERE", "ORDER", etc.), field names (e.g., "id", "name", "market_cap", etc.), table name (e.g., "stocks_info") and selection criteria (e.g., "region=United States", etc.

Referring again to FIG. 4, at step 410, a query can be generated using the logical expression. By way of a non-limiting example, data source interface module 304 can use logical expression 600 to generate a query using a query language used by system 340 to access data source 342. In accordance with one or more embodiments, data source interface module 304 can use a mapping that maps the command constructs, field names, tables, selection criteria, etc. of logical expression 600 to the constructs, field names, tables, selection criteria, etc. of the query language used by system 340 and data source 342.

As discussed herein, logical expression 600 can be used with a number of query languages to generate a number of different queries for searching different systems 340 and data sources 342 to retrieve data using logical expression 600.

FIGS. 7A and 7B provides an exemplary non-limiting example illustrating a pseudo-JSON query 700 that can be generated using logical expression 600. Likewise, logical expression 600 can be used to generate example GraphQL® query 800 shown in FIG. 8 and example MySQL® query 900 shown in FIG. 9.

Referring again to FIG. 4, at step 412, a set of query results can be retrieved using a generated query. By way of a non-limiting example, at step 412, data source interface module 304 can transmit a data request including the query generated at step 410 to system 340 to retrieve a set of search results from system 340 and data source 342. At step 414, a response to the natural language input can be generated. By way of a non-limiting example, at step 414, response generation module 306 can generate a response to the natural language input using the set of query results received by data source interface module 304 at step 412.

At step 414, a response can be communicated to a client device. By way of a non-limiting example, at step 414, response generation module 306 can communicate the response generated at step 412 to a client device of the user submitting the natural language input. In accordance with one or more embodiments, communication of the response to the client device causes a display of the client device to be updated to include the generated response.

In accordance with one or more embodiments, engine 300 can provide feedback to LLM 330 to tune LLM 330 over time using the set of examples provided in the prompt. In accordance with one or more embodiments, the set of examples can include at least one example used as feedback to tune, or improve, LLM 330. The example that is used as feedback can correspond to an incorrect logical expression translation output by LLM 330 in connection with a natural language input provided to LLM 330. The example included in prompt 500 can include the natural language input and a corrected logical expression translation of the natural language input. The corrected logical expression translation can inform LLM 330 of the correct logical expression for the natural language input. One or more such examples can be included in a prompt as feedback to tune LLM 330 and improve the quality of the LLM (e.g., improve the metrics of the LLM, such as and without limitation an accuracy metric of the LLM).

In accordance with one or more embodiments, engine 300 can use database 320 to maintain a history of each, or at least some, of the natural language input examples submitted to LLM 330 and the corresponding logical expression output examples received from LLM 330. Engine 300 can use human editors and receive input from the human editors indicating whether or not a logical expression translation is an accurate translation of a natural language input example. Engine 300 can update the historical data store in database 320 based on the input received from a human editor. Engine 300 can update the historical data stored in database 320 to indicate that a logical expression is accurate when the input from the human editor indicates that the logical expression is an accurate translation of the natural language input. On the other hand, engine 300 can update the historical data stored in database 320 (e.g., by replacing the logical expression generated by LLM 330 with a second, corrected logical expression received from the human editor) when the input from the human editor indicates that the logical expression is not an accurate translation of the natural language input from the user.

Embodiments of the present disclosure have been described in connection with accessing financial data digitally stored in a financial data store. The disclosed embodiments are not limited to such data and can be used to access any type of digitally-stored data. The information provided in prompt 500 used with disclosed embodiments can be modified to accommodate any type of data. By way of some non-limiting examples, section 502 can be used to supply a task description corresponding to the type of digitally-stored data being accessed, sections 504, 506 and 510 can provide processing information that can be used by LLM 330 to form a logical expression in an intermediate form, which can be used to generate a query for one or more computing systems, applications, application programming interfaces (APIs), etc. to access digitally-stored data. Additionally, section 508 can provide a set of examples, each one comprising sample input, or query, in the form of a natural language input and sample output in the form of a logical expression corresponding to the natural language input. Section 512 can include the natural language query input that is to be translated to a logical expression by LLM 330 using the information included in prompt 500. The logical expression can then be used to generate a query to access a given data store using a mapping of the logical expression to the query, as discussed herein.

As shown in FIG. 10, internal architecture 1000 of a computing device(s), computing system, computing platform, user devices, set-top box, smart TV and the like includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), media disk drive interface 1008 as an interface for a drive that can read and/or write to media, display interface 1010 as interface for a monitor or other display device, keyboard interface 1016 as interface for a keyboard, pointing device interface 1018 as an interface for a mouse or other pointing device, CD/DVD drive interface 1020 as an interface for a CD/DVD drive, and miscellaneous other interfaces 1022 not shown individually, such as parallel and serial port interfaces and a universal serial bus (USB) interface.

Memory 1004 interfaces with computer bus 1002 so as to provide information stored in memory 1004 to CPU 1012 during execution of software programs such as an operating system, application programs, device drivers, and software modules that comprise program code, and/or computer executable process steps, incorporating functionality described herein, e.g., one or more of process flows described herein. CPU 1012 first loads computer executable process steps from storage, e.g., memory 1004, computer readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1034 typically provides information communication using transmission media through one or more networks to other devices that use or process the information. For example, network link 1034 may provide a connection through local network 1024 to a host computer 1026 or to equipment operated by a Network or Internet Service Provider (ISP) 1030. ISP equipment in turn provides data communication services through the public, worldwide packet-switching communication network of networks now commonly referred to as the Internet 1032.

A computer called a server host 1026 connected to the Internet 1032 hosts a process that provides a service in response to information received over the Internet 1032. For example, server host 1034 hosts a process that provides information representing video data for presentation at a display via display interface 1010. It is contemplated that the components of system 1000 can be deployed in various configurations within other computer systems, e.g., host and server.

At least some embodiments of the present disclosure are related to the use of computer system 1000 for implementing some or all of the techniques described herein. According to one embodiment, those techniques are performed by computer system 1000 in response to processing unit 1012 executing one or more sequences of one or more processor instructions contained in memory 1004. Such instructions, also called computer instructions, software and program code, may be read into memory 1004 from another computer-readable medium 1006 such as storage device or network link. Execution of the sequences of instructions contained in memory 1004 causes processing unit 1012 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through a communications interface carry information to and from computer system 1000. Computer system 1000 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1012 as it is received, or may be stored in memory 1004 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
receiving, at a computing device, natural language input from a user;
generating, by the computing device, a prompt using the natural language input, the prompt comprising feedback to tune a large language model (LLM);
generating, by the computing device, a logical expression of the natural language input using the LLM and the prompt;
generating, by the computing device, for a data source, a query using the logical expression;
retrieving, by the computing device, a query result set from the data source using the query; and
generating, by the computing device, a response to the natural language input using the query result set.

2. The method of claim 1, further comprising:
communicating, via the computing device, the generated response to a client device of the user, the communicating causing a display of the client device to be updated to include the generated response.

3. The method of claim 1, the logical expression is independent of the data source and the query is dependent on the data source.

4. The method of claim 1, further comprising:
generating, by the computing device, a second query for a second data source using the logical expression; and
retrieving, by the computing device, a second query result set from the second data source using the second query.

5. The method of claim 1, the prompt comprising information to configure the LLM to generate the logical expression based on the natural language input.

6. The method of claim 5, the configuration information comprising task description, processing information and examples.

7. The method of claim 6, the processing information comprising information indicating constructs available for the logical expression.

8. The method of claim 7, the constructs available for the logical expression comprising one or more of available operators, fields and field values.

9. The method of claim 6, the processing information comprising information indicating a format of the logical expression.

10. The method of claim 6, a respective example of the examples comprises an example input and an example output corresponding to the example input, the example input is a natural language example input and the example output is a logical expression translation of the natural language example input.

11. The method of claim 10, further comprising:
including, by the computing device, in the examples provided to the LLM, as feedback to the LLM, at least one example of an incorrect logical expression translation provided by the LLM in connection with a second natural language input, the at least one example including the second natural language input and corrections to the incorrect logical expression translation.

12. The method of claim 1, further comprising:
storing, by the computing device, in a historical data store, the natural language user input and the logical expression generated by the LLM using the prompt.

13. The method of claim 12, further comprising:
receiving, by the computing device, from an editor, input indicating whether or not the logical expression is an accurate translation of the natural language input.

14. The method of claim 13, further comprising:
updating, by the computing device, the historical data store to indicate that the logical expression is accurate when the input from the editor indicates that the logical expression is an accurate translation of the natural language input from the user.

15. The method of claim 14, the updating further comprising:
updating, by the computing device, the historical data store by replacing the logical expression generated by the LLM with a second logical expression received from the editor when the input from the editor indicates that the logical expression is not an accurate translation of the natural language input from the user.

16. A non-transitory computer-readable storage medium tangibly encoded with computer-executable instructions that when executed by a processor associated with a computing device perform a method comprising:
receiving natural language input from a user;
generating a prompt using the natural language input, the prompt comprising feedback to tune a large language model (LLM);
generating a logical expression of the natural language input using the LLM and the prompt;
generating, for a data source, a query using the logical expression;
retrieving a query result set from the data source using the query; and
generating a response to the natural language input using the query result set.

17. The non-transitory computer-readable storage medium of claim 16, the logical expression is independent of the data source and the query is dependent on the data source.

18. The non-transitory computer-readable storage medium of claim 16, the prompt comprising information to configure the LLM to generate the logical expression based on the natural language input, the configuration information comprising task description, processing information and examples.

19. The non-transitory computer-readable storage medium of claim 18, the method further comprising:
including, in the examples provided to the LLM, as feedback to the LLM, at least one example of an incorrect logical expression translation provided by the LLM in connection with a second natural language input, the at least one example including the second natural language input and corrections to the incorrect logical expression translation.

20. A computing device comprising:

a processor; and a non-transitory storage medium for tangibly storing thereon program logic for execution by the processor, the program logic comprising:

receiving logic executed by the processor for receiving natural language input from a user;

generating logic executed by the processor for generating a prompt using the natural language input, the prompt comprising feedback to tune a large language model (LLM);

generating logic executed by the processor for generating a logical expression of the natural language input using the LLM and the prompt;

generating logic executed by the processor for generating, for a data source, a query using the logical expression;

retrieving logic executed by the processor for retrieving a query result set from the data source using the query; and generating logic executed by the processor for generating a response to the natural language input using the query result set.

\* \* \* \* \*